United States Patent
Bender

(10) Patent No.: US 11,214,125 B2
(45) Date of Patent: Jan. 4, 2022

(54) CLOSABLE AIR VENT

(71) Applicant: Taylor Made Group, LLC, Gloversville, NY (US)

(72) Inventor: Thomas J. Bender, Fort Wayne, IN (US)

(73) Assignee: Taylor Made Group, LLC, Gloversville, NY (US)

( * ) Notice: Subject to any disclaimer, the term of this patent is extended or adjusted under 35 U.S.C. 154(b) by 468 days.

(21) Appl. No.: 16/178,900

(22) Filed: Nov. 2, 2018

(65) Prior Publication Data

US 2019/0135082 A1    May 9, 2019

Related U.S. Application Data

(60) Provisional application No. 62/582,009, filed on Nov. 6, 2017.

(51) Int. Cl.
| | | |
|---|---|---|
| *B60H 1/26* | (2006.01) | |
| *B60J 1/02* | (2006.01) | |
| *B60H 1/00* | (2006.01) | |
| *B60J 1/20* | (2006.01) | |
| *B60H 1/34* | (2006.01) | |

(52) U.S. Cl.
CPC ......... *B60H 1/267* (2013.01); *B60H 1/00678* (2013.01); *B60H 1/3407* (2013.01); *B60J 1/02* (2013.01); *B60J 1/20* (2013.01); *B60H 2001/00707* (2013.01); *B60H 2001/3464* (2013.01); *B60H 2001/3471* (2013.01); *B60Y 2200/20* (2013.01)

(58) Field of Classification Search
USPC .......................................... 454/160
See application file for complete search history.

(56) References Cited

U.S. PATENT DOCUMENTS

| | | | | |
|---|---|---|---|---|
| 1,771,731 A | * | 7/1930 | Mohr ...................... | B60H 1/28 454/150 |
| 1,851,286 A | * | 3/1932 | Mohr ..................... | B60H 1/267 454/150 |
| 2,125,023 A | * | 7/1938 | Hedin ...................... | B60H 1/28 454/150 |
| 2,460,604 A | * | 2/1949 | Simcox .................. | B64D 13/00 454/94 |
| 3,090,292 A | * | 5/1963 | Berliner ................ | B60H 1/265 454/135 |

(Continued)

OTHER PUBLICATIONS

"Spring Pin": Wikipedia (R), The Wikimedia Foundation, Inc. https://en.wikipedia.org/wiki/Spring_pin Pertinent pages: p. 1-2 of 3 pages (Year: 2021).*

*Primary Examiner* — Edelmira Bosques
*Assistant Examiner* — Frances F. Hamilton
(74) *Attorney, Agent, or Firm* — Nixon & Vanderhye P.C.

(57) ABSTRACT

A closable air vent may be bonded to a laminated or tempered windshield used on UTV or other types of vehicles. The air vent may include a vent body with a flap opening and a bond channel, a flap pivotably secured in the flap opening on a flap pivot, and an actuator coupled with the flap via a roll pin and displaceable between a flap closed position and a flap open position. In the flap closed position, the roll pin is disposed on one side of the flap pivot, and in the flap open position, the roll pin is disposed on an opposite side of the flap pivot.

11 Claims, 3 Drawing Sheets

(56) References Cited

U.S. PATENT DOCUMENTS

| | | | |
|---|---|---|---|
| 3,145,639 A * | 8/1964 | Warner | B60H 1/267 454/141 |
| 3,255,685 A * | 6/1966 | Hitzelberger | B60H 1/28 454/150 |
| 3,290,706 A * | 12/1966 | Hale | B63B 19/02 114/361 |
| 3,311,041 A * | 3/1967 | Ahrens | B60H 1/267 454/95 |
| 3,648,591 A * | 3/1972 | Winnett | F24F 7/065 454/158 |
| 4,615,556 A | 10/1986 | Stahel | |
| 4,721,031 A | 1/1988 | Nakata et al. | |
| 4,730,662 A | 3/1988 | Kobayashi | |
| 4,741,258 A | 5/1988 | Trube et al. | |
| 4,907,500 A * | 3/1990 | Brown | F24F 13/15 454/290 |
| 4,919,603 A | 4/1990 | Herold et al. | |
| 4,962,961 A | 10/1990 | Ito et al. | |
| 4,970,946 A * | 11/1990 | Ivey | B60H 1/267 114/211 |
| 5,025,130 A | 6/1991 | Slone | |
| 5,137,326 A | 8/1992 | George | |
| 5,376,044 A * | 12/1994 | Tippin | F24F 13/18 251/303 |
| 5,709,163 A * | 1/1998 | Livingston | B63B 19/04 114/211 |
| 5,797,791 A * | 8/1998 | Humphrey | B60J 1/08 454/134 |
| 5,893,192 A | 4/1999 | Lee | |
| 5,916,022 A | 6/1999 | Lam | |
| 6,000,743 A | 12/1999 | Hart | |
| 6,048,263 A * | 4/2000 | Uchida | B60H 1/00064 165/204 |
| 6,089,971 A | 7/2000 | Lokela et al. | |
| 6,168,516 B1 | 1/2001 | White | |
| 6,247,518 B1 | 6/2001 | Wickersty | |
| 6,280,315 B1 * | 8/2001 | Kelly | B60H 1/265 454/145 |
| 6,514,135 B1 * | 2/2003 | Kelly | B60H 1/262 454/129 |
| 6,558,246 B2 * | 5/2003 | Kelly | B60H 1/26 454/145 |
| 6,712,689 B2 | 3/2004 | Clarkson et al. | |
| 7,059,650 B1 | 6/2006 | Wood | |
| 7,114,760 B2 * | 10/2006 | Cameron | B60J 1/20 296/152 |
| 7,364,187 B2 | 4/2008 | Dietze et al. | |
| 7,441,510 B1 | 10/2008 | Bach | |
| 7,954,443 B2 * | 6/2011 | Mason | B63B 19/00 114/361 |
| 8,449,013 B2 | 5/2013 | Carter | |
| 8,689,975 B2 * | 4/2014 | Burke | B65H 57/14 206/409 |
| 9,150,088 B2 | 10/2015 | Yang | |
| 9,205,725 B1 | 12/2015 | Yang | |
| 10,323,852 B2 * | 6/2019 | Takanaga | B60K 11/085 |
| 10,493,828 B2 * | 12/2019 | Luo | B60J 1/20 |
| 10,787,062 B2 * | 9/2020 | Lee | B60H 1/3421 |
| 2006/0225271 A1 * | 10/2006 | Barina | H05K 7/1429 29/830 |
| 2007/0296237 A1 * | 12/2007 | Anderson | B62J 17/04 296/78.1 |
| 2010/0022180 A1 * | 1/2010 | Nutt | E06B 7/02 454/211 |
| 2015/0231950 A1 * | 8/2015 | Bender | B60J 1/20 403/288 |

* cited by examiner

CLOSABLE AIR VENT

CROSS-REFERENCES TO RELATED APPLICATIONS

This application claims the benefit of U.S. Provisional Patent Application No. 62/582,009, filed Nov. 6, 2017, the entire content of which is herein incorporated by reference.

STATEMENT REGARDING FEDERALLY SPONSORED RESEARCH OR DEVELOPMENT (Not Applicable)

BACKGROUND

The invention relates to a windshield air vent and, more particularly, to a closable air vent bonded with an adhesive to a laminated or tempered windshield.

A UTV (utility task vehicle or utility terrain vehicle) windshield serves to prevent wind, rain and debris from impacting the occupants of the cabin. A UTV cabin is generally closed by the windshield, and without a vent, very little cooling air reaches the cabin.

Existing vents can be difficult to install, requiring modifications or a pass-through in the windshield. It can also be difficult to secure a vent assembly to the windshield.

BRIEF SUMMARY

It would thus be desirable to provide a closable air vent for a windshield that provides for selective influx of outside air into the cabin. It would also be desirable to provide an air vent assembly that can be readily secured to the windshield.

The vent assembly of the described embodiments is designed to be mounted to a laminated or tempered windshield by using a bonding adhesive. This adhesive proves a solid means of mounting as well as a means of sealing the area between the vent assembly and the laminated or tempered glass. The vent may be selectively opened and closed using an actuator to push the vent flap into an open position or to pull the vent flap into a closed position.

In an exemplary embodiment, an air vent attachable to a windshield includes a vent body with a flap opening and a bond channel, a flap pivotably secured in the flap opening on a flap pivot, and an actuator coupled with the flap via a roll pin and displaceable between a flap closed position and a flap open position. In the flap closed position, the roll pin is disposed on one side of the flap pivot, and in the flap open position, the roll pin is disposed on an opposite side of the flap pivot.

The bond channel may extend across a width of the vent body and along sides of the vent body.

The actuator may include an oblong hole, and the roll pin may be disposed in the oblong hole. The roll pin may be freely displaceable in the oblong hole. The roll pin may be displaceable in the oblong hole between a closed position and an open position, and a lever arm between the actuator and the roll pin in the open position may be longer than the lever arm in the closed position. The actuator may be linearly displaceable between the flap open position and the flap closed position by virtue of the oblong hole in the actuator. The flap may include a key protruding from an actuator side of the flap. In the context, the key may have an opening, and the roll pin may be secured in the opening. The actuator may include at least one key bracket disposed in engagement with the key, and the oblong hole may be positioned in the at least one key bracket. The actuator may include a pair of key brackets disposed in engagement with the key and positioned on opposite sides of the key, and the oblong hole may extend through both of the key brackets.

The flap may be configured such that in the flap closed position, airflow urges the flap toward the flap closed position, and in the flap open position, airflow urges the flap toward the flap open position. In this context, the flap may include an angled section at a distal end relative to the flap pivot.

In another exemplary embodiment, a windshield includes a glass panel, at least one scallop cut disposed in a periphery of the glass panel, and a corresponding at least one of the air vents secured in the at least one scallop cut. The at least one air vent may be secured in the at least one scallop cut via an adhesive disposed in the bond channel. The at least one scallop cut may be positioned in a lower edge of the glass panel. In some embodiments, the windshield includes a plurality of scallop cuts in the glass panel.

BRIEF DESCRIPTION OF THE DRAWINGS

These and other aspects and advantages will be described in detail with reference to the accompanying drawings, in which.

DETAILED DESCRIPTION

Figure 1:
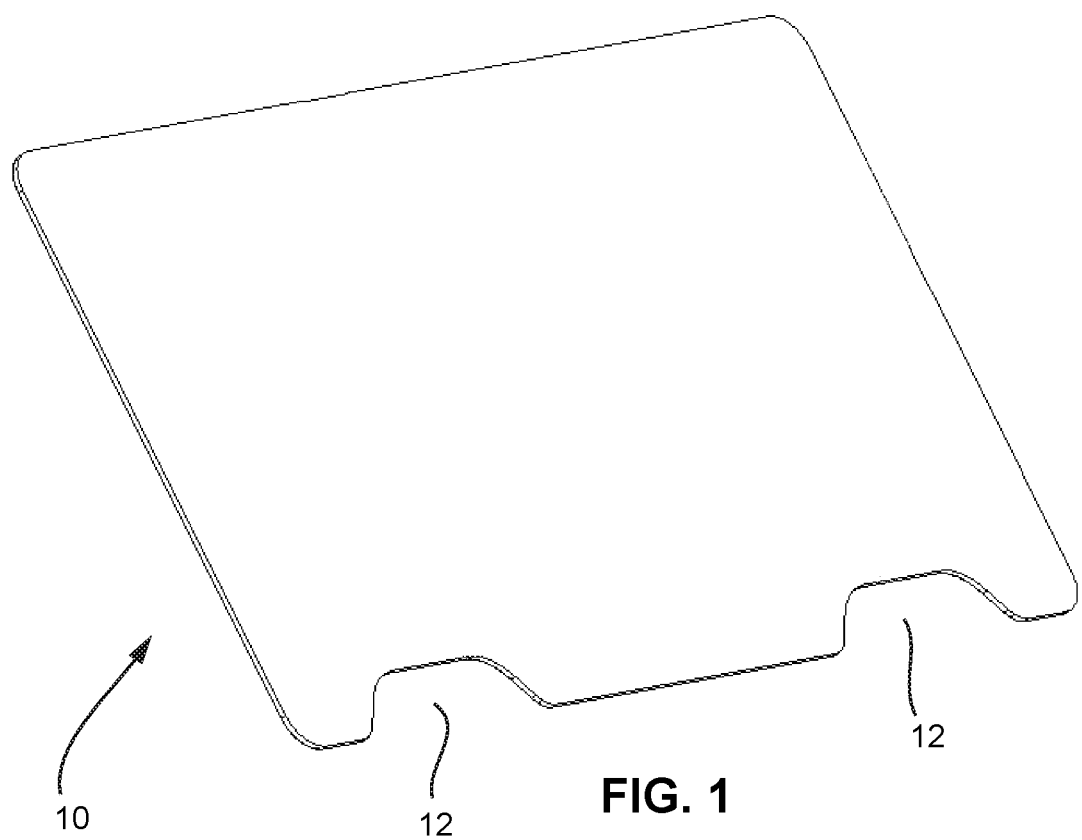
FIG. 1 shows an exemplary laminated or tempered windshield with scallop cuts in a lower edge.
Figure 2:
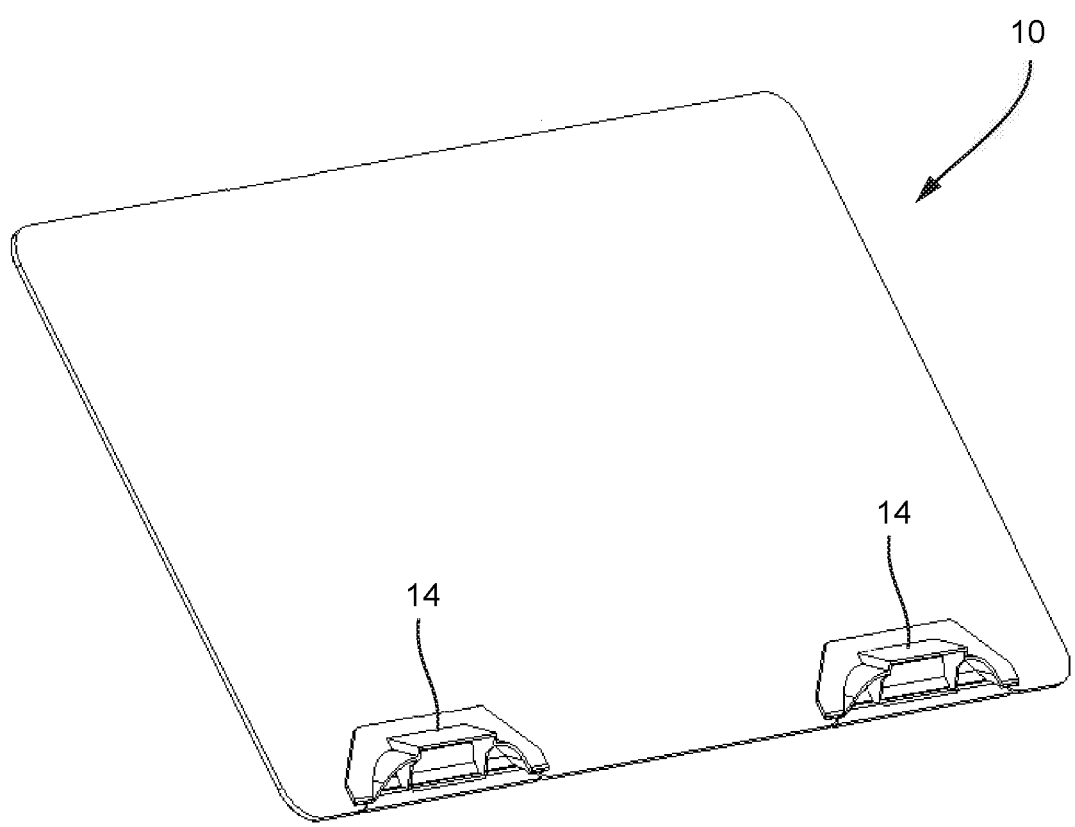
FIG. 2 shows the windshield including two vent assemblies.

FIG. 1 shows an exemplary laminated or tempered windshield 10, which may be suitable for use on UTV vehicles. The windshield 10 is shown with scallop cuts 12 on a lower edge. The scallop cuts 12 are positioned to receive the vent assembly 14 (FIG. 2) of the described embodiments, and the scallop cuts 12 are not limited to the lower edge of the windshield 10. Rather, the cuts 12 may be placed in the top and/or side edges of the windshield 10 depending on the application. The geometry of the scallop cuts 12 may be dictated by the equipment and process used by the glass manufacturer. FIG. 2 shows two vent assemblies 14 bonded to the windshield adjacent the scallop cuts.

Figure 3:
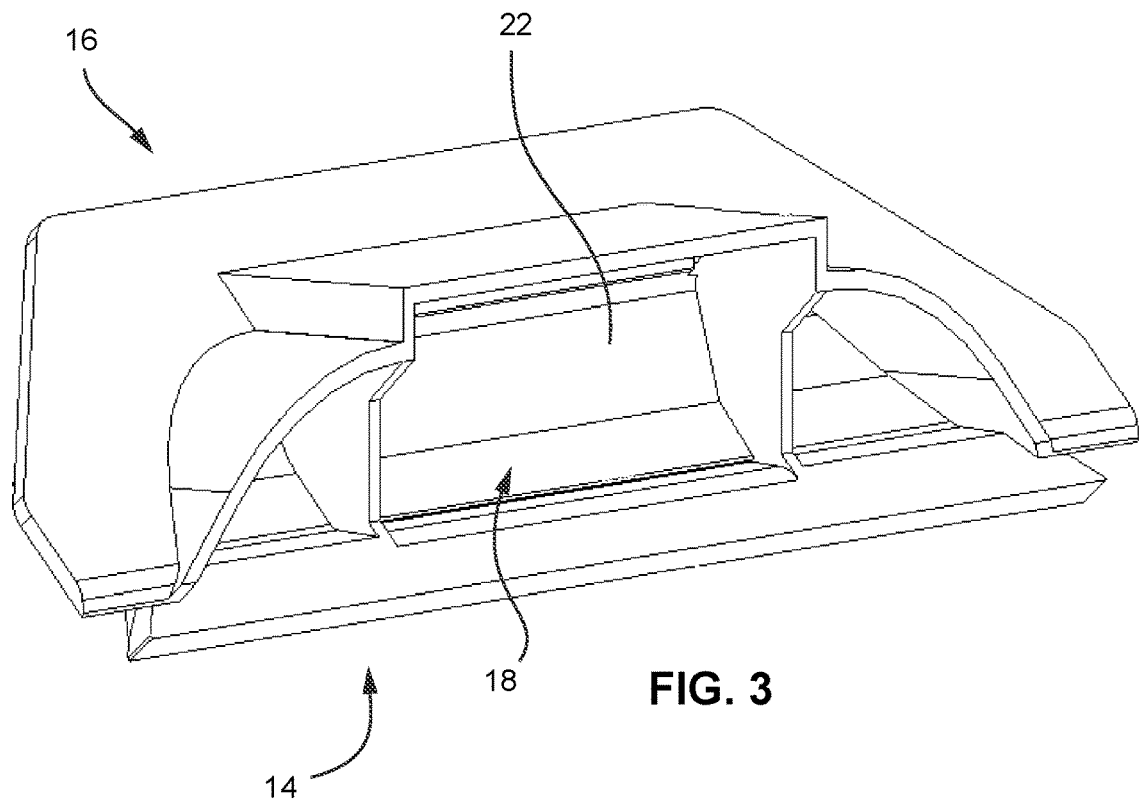
FIG. 3 is an outer perspective view of the vent assembly.
Figure 4:
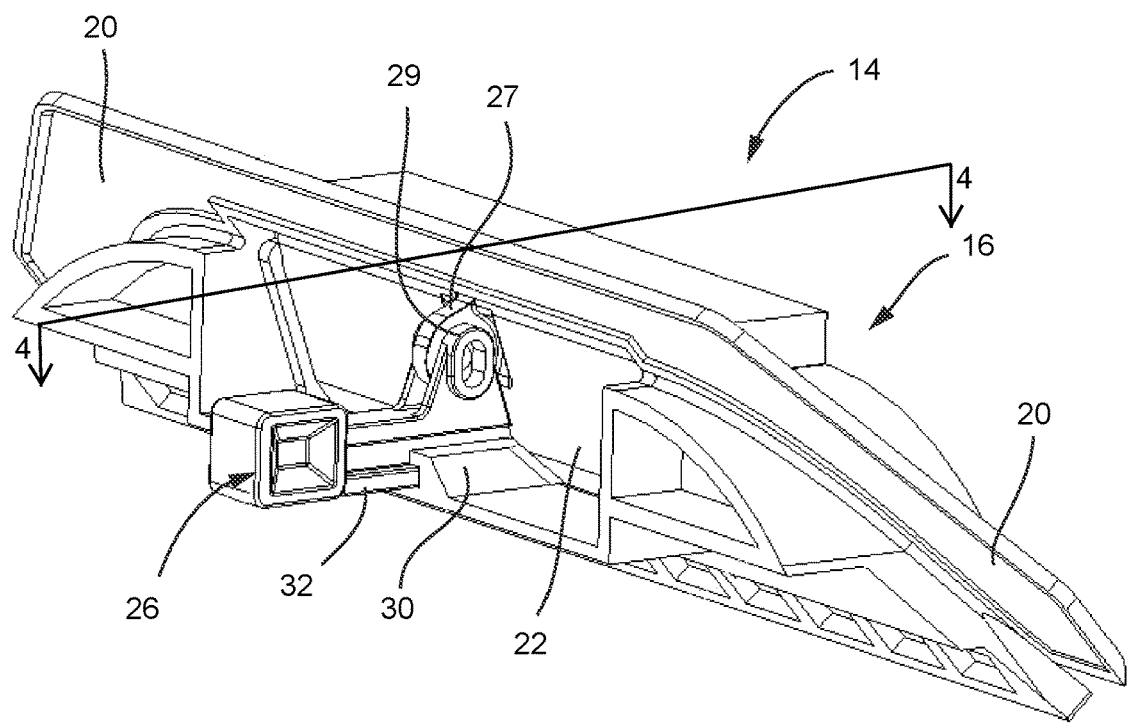
FIG. 4 is an inside view of the vent assembly.

FIG. 3 shows an outer view of the vent assembly 14, and FIG. 4 shows an inner view of the vent assembly 14. With reference to FIGS. 3 and 4, the vent assembly 14 includes a vent body 16 with a flap opening 18 and a bond channel 20. As shown in FIG. 4, the bond channel 20 extends along the top and sides of the vent body 16. In a preferred construction, the vent assembly 14 is secured over the scallop cuts 12 with an adhesive disposed in the bond channel 20. A vent flap 22 is pivotably secured in the flap opening 18 on a flap pivot 24 (FIGS. 5 and 6).

Figure 5:
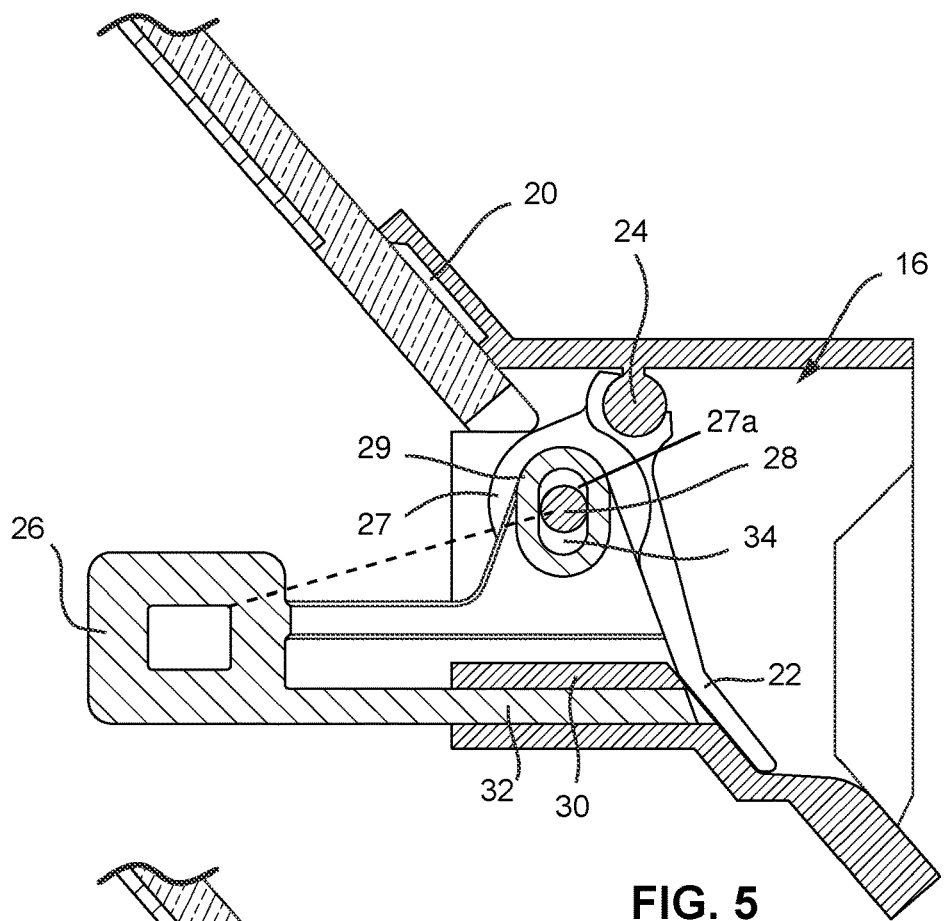
FIG. 5 is a cross section of the vent assembly along line 4-4 in FIG. 4 bonded to the windshield and in the closed position.
Figure 6:
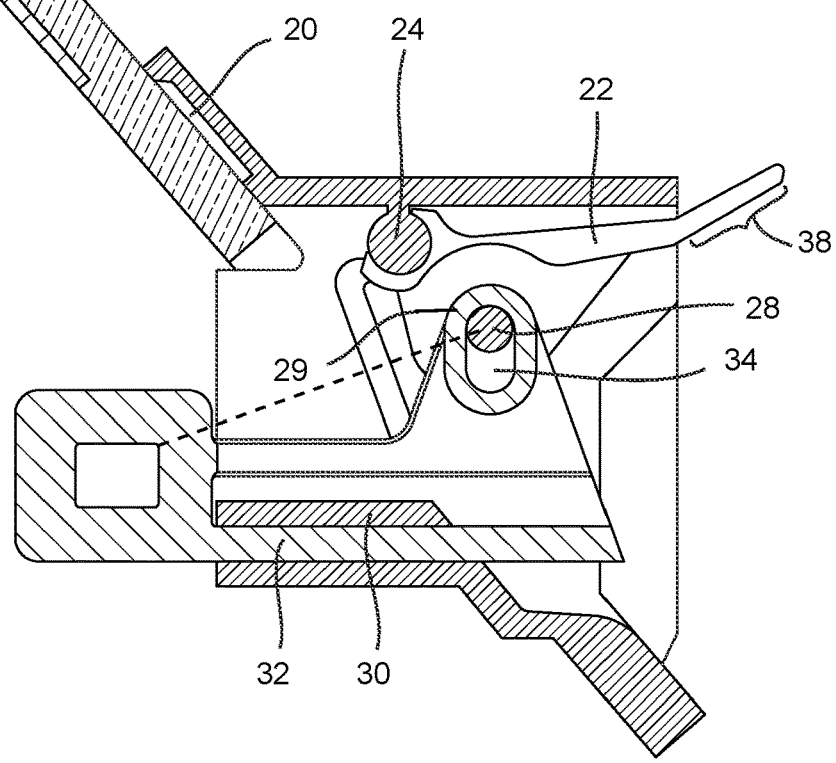
FIG. 6 is a cross section along line 4-4 in FIG. 4 with the vent assembly in the open position.

FIGS. 5 and 6 are cross sectional views with the vent flap 18 in a closed position and an open position, respectively. An actuator 26 is coupled with the flap 22 via a bracket 27 and a roll pin 28. The actuator 26 includes a key 29, and the bracket 27 protrudes from an actuator side of the flap 22. The bracket 27 receives the key 29, the key 29 includes an opening 34 as shown, and the roll pin 28 extends across or through an opening 27a in the bracket 27 and is secured in the opening 34. In some embodiments, the roll pin 28 is a spring loaded roll pin that is held in place by expanding after being inserted into position. To displace the flap 22 from the closed position shown in FIG. 5 to the open position shown in FIG. 6, the actuator 26 is displaced linearly in a linear track defined by a tab 30. The actuator 26 includes a rail 32 that rides in the track defined by the tab 30.

In comparing FIGS. 5 and 6, in the flap closed position shown in FIG. 5, the roll pin 28 is disposed on one side of the flap pivot 24, whereas in the flap open position (FIG. 6), the roll pin 28 is disposed on an opposite side of the flap pivot 24.

The opening 34 in the actuator 26 may be an oblong hole 34 in which the roll pin 28 is disposed. The roll pin 28 thU.S. extends through the oblong hole 34 in the actuator 26 and through the opening in the bracket 27 protruding from the flap 22. The roll pin 28 is freely displaceable (up and down in FIGS. 5 and 6) in the oblong hole 34. With this construction, a lever arm between the actuator 26 and the roll pin 28 is longer in the open position than in the closed position (compare the dashed lines from an arbitrary fixed point on the actuator to the roll pin in FIGS. 5 and 6). This structure results in a "snap" open condition when opening the flap and a "snap" closed condition when closing the flap.

The linear displacement of the actuator 26 is facilitated by the oblong hole 34. That is, as the actuator 26 is pushed linearly forward, the vent flap 22 is pivoted on the flap pivot 24 thereby raising the roll pin 28 relative to the actuator 26. Compare, for example, a position of the roll pin 28 in FIGS. 5 and 6. The oblong hole 34 accommodates the vertical displacement of the roll pin 28, and as a consequence, the actuator 26 is linearly displaceable.

With continued reference to FIGS. 5 and 6, the flap 22 is preferably configured such that in the flap closed position (FIG. 5), airflow urges the flap 22 toward the flap closed position. In the flap open position (FIG. 6), airflow urges the flap toward the flap open position. This configuration may be achieved by the angle of the flap 22 in the open position relative to a travel direction such that airflow strikes an underside or backside of the flap 22 to urge the flap 22 to maintain the open position. Alternatively or additionally, the flap 22 may be provided with an angled section 38 at a distal end relative to the flap pivot 24 as shown in FIG. 6.

The roll pin actuation of the flap 22 is situated near the flap pivot 24, resulting in the snap open condition (i.e., the flap action is amplified with respect to the actuator action). To close the vent, the operator pulls on the actuator 26, which then pulls the vent flap 22 into the closed position. The roll pin actuation of the flap is similarly situated near the flap pivot, resulting the snap closed condition (i.e., the flap action is amplified with respect to the actuator action).

With the windshield and vent assembly according to the described embodiments, outside air can be selectively directed through the windshield into the passenger cabin. The vent assembly can be secured to scallops cuts in a laminated or tempered windshield with an adhesive. Although the vent assembly has been described in the context of a UTV vehicle, the vent assembly is equally applicable to other vehicle types, and the invention is not meant to be limited to the described application.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An air vent attachable to a windshield, the air vent comprising:
a vent body including a flap opening and a bond channel;
a flap pivotably secured in the flap opening on a flap pivot, the flap including a bracket with a first opening;
an actuator coupled with the flap and displaceable between a flap closed position and a flap open position, the actuator including a key with a second opening in alignment with the first opening; and
a spring loaded roll pin extending into the first opening and the second opening to connect the actuator and the flap, wherein the spring loaded roll pin is displaceable in the second opening and relative to the actuator, wherein the second opening comprises an oblong hole, and wherein the spring loaded roll pin is disposed in the oblong hole, wherein in the flap closed position, the spring loaded roll pin is disposed on one side of the flap pivot, and in the flap open position, the spring loaded roll pin is disposed on an opposite side of the flap pivot.

2. An air vent according to claim 1, wherein the bond channel extends across a width of the vent body and along sides of the vent body.

3. An air vent according to claim 1, wherein the flap comprises an angled section at a distal end relative to the flap pivot.

4. An air vent according to claim 1, wherein the spring loaded roll pin is freely displaceable in the oblong hole.

5. An air vent according to claim 4, wherein the spring loaded roll pin is displaceable in the oblong hole between a closed position and an open position, and wherein a lever arm between the actuator and the spring loaded roll pin in the open position is longer than the lever arm in the closed position.

6. An air vent according to claim 4, wherein the actuator is linearly displaceable between the flap open position and the flap closed position by virtue of the oblong hole in the actuator.

7. A windshield comprising:
a glass panel;
at least one scallop cut disposed in a periphery of the glass panel; and
a corresponding at least one air vent secured in the at least one scallop cut, the air vent comprising:
a vent body including a flap opening and a bond channel,
a flap pivotably secured in the flap opening on a flap pivot, the flap including a bracket with a first opening,
an actuator coupled with the flap and displaceable between a flap closed position and a flap open position, the actuator including a key with a second opening in alignment with the first opening, and
a spring loaded roll pin extending into the first opening and the second opening to connect the actuator and the flap, wherein the spring loaded roll pin is displaceable in the second opening and relative to the actuator, wherein the second opening comprises an oblong hole, and wherein the spring loaded roll pin is disposed in the oblong hole, wherein in the flap closed position, the spring loaded roll pin is disposed on one side of the flap pivot, and in the flap open position, the spring loaded roll pin is disposed on an opposite side of the flap pivot.

8. A windshield according to claim 7, wherein the at least one air vent is secured in the at least one scallop cut via an adhesive disposed in the bond channel.

9. A windshield according to claim 7, wherein the at least one scallop cut is positioned in a lower edge of the glass panel.

10. A windshield according to claim 7, comprising a plurality of scallop cuts in the glass panel.

11. An air vent attachable to a windshield, the air vent comprising:
- a vent body including a flap opening;
- a flap pivotably secured at a proximal end in the flap opening on a flap pivot;
- a bracket connected to the flap and including a spring loaded roll pin opening;
- a manually-operated linear actuator including an oblong hole, the actuator being coupled with the flap via a spring loaded roll pin disposed in the spring loaded roll pin opening of the bracket and extending into the oblong hole, wherein the spring loaded roll pin is displaceable in the oblong hole relative to the actuator.

\* \* \* \* \*